United States Patent Office 3,548,640
Patented Dec. 22, 1970

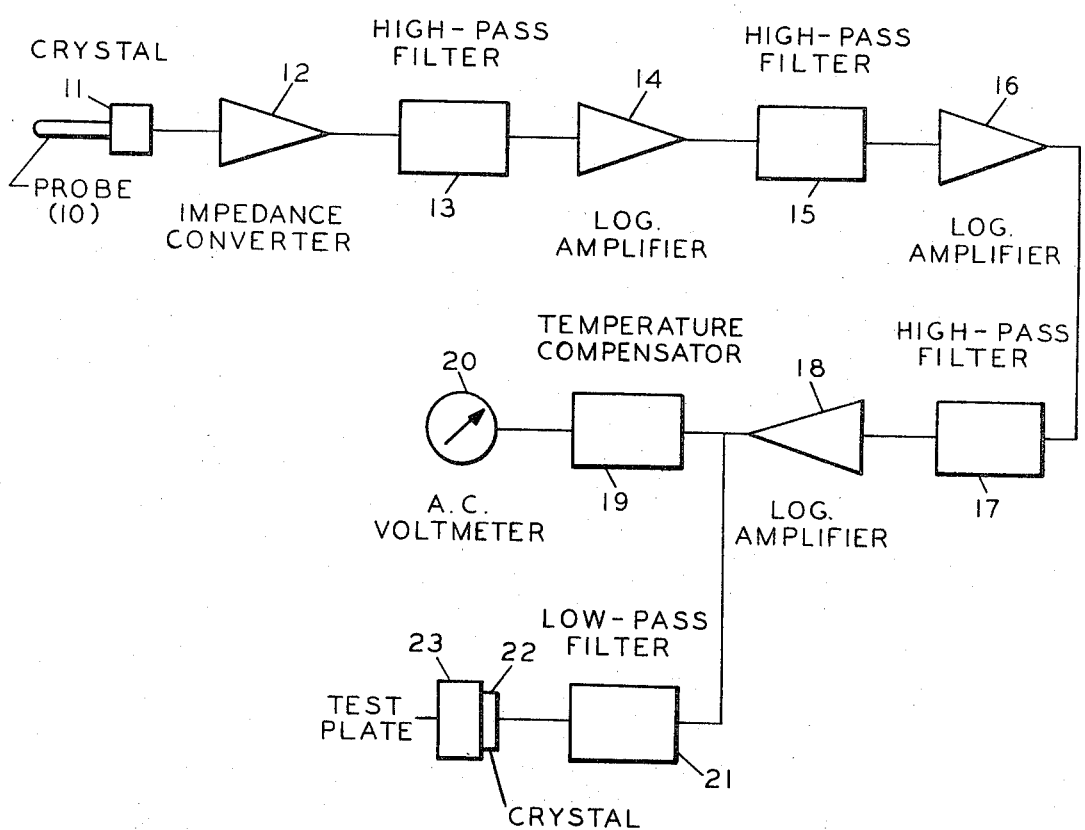

3,548,640
CAVITATION DETECTOR
Wallace R. Deason, Akron, Ohio, and Lewis Fowler, University City, and Walter N. Trump, Webster Groves, Mo., assignors to Monsanto Company, St. Louis, Mo., a corporation of Delaware
Filed Apr. 13, 1967, Ser. No. 630,667
Int. Cl. G01n 29/04
U.S. Cl. 73—67.2         3 Claims

ABSTRACT OF THE DISCLOSURE

Means and method for detecting fluid cavitation within hydraulic systems. The apparatus employs a tuned piezoelectric probe assembly cooperating with filters and logarithmic amplifiers to consider frequencies between about 30,000 and about 100,000 c.p.s. By bringing the probe into contact with a servo-valve or the like, cavitation and internal leakage can be detected.

---

Cavitation damage has recently become an issue of substantial concern in aircraft hydraulic systems. Most modern multi-engine aircraft employ hydraulic servo-control systems to position flight control surfaces such as rudders, ailerons and air brakes, as well as to perform other functions. It has been found that servo-control valves within these systems frequently malfunction due to metal damage at the edges of the fluid ports. This damage is attributed to the effects of fluid cavitation.

Cavitation is defined as the formation of bubbles of gas or vapor in a liquid due to localized low pressure areas caused by relative motion of a liquid and a solid. As the bubbles later reach a point of higher pressure, a violent collapse occurs, thereby producing shock waves which can be severe enough to damage the mechanical members in contact with the fluid. Cavitation is often found in a fluid flowing through a restriction such as a partly closed valve or an orifice.

Cavitation damage is usually characterized by physical alteration of the affected surface. Such alteration can range from subtle deformation of the surface geometry to serious erosion of the material. The mechanical parts of a hydraulic system, such as pumps and valves, can experience a marked change in performance as the geometry of the parts is altered through cavitation damage. Such physical changes in pumps can cause a decrease in pumping efficiency and, in the case of valves, can cause faulty operation, excessive leakage, or even hazardous conditions. Cavitation is particularly harmful in aircraft systems because of the safety hazards encountered.

In addition to physical damage of mechanical parts from cavitation effects, the working fluid itself can become contaminated from the metal particles produced by erosion. Further effects are clogging of the system filter, excessive filter replacement and changes in the physical and chemical properties of the fluid. Metal contaminants can reduce the oxidative stability of a fluid, thereby adversely affecting fluid performance.

A long-standing need has existed for a simple and accurate means of detecting and analyzing fluid cavitation within hydraulic systems, particularly aircraft hydraulic systems. The means and method of the present invention provide for the sensitive and efficient detection and analysis of cavitation such as that which precedes and accompanies abnormal internal leakage in aircraft servo-valves.

It is an object of the present invention, therefore, to provide a cavitation detector capable of readily isolating and analyzing cavitation within the components of hydraulic systems.

Another object of the present invention is to provide the means and method for flight-line testing of aircraft hydraulic systems for early detection of cavitation and excessive valve leakage before a hazard occurs.

Another object of the present invention is to employ a cavitation detector of broad frequency range wherein noises below about 30,000 c.p.s. frequency are ignored, but wherein all noises from 30,000 c.p.s. to 100,000 c.p.s. are included.

Still another object of the present invention is to provide in the detector an amplifier system having logarithmic response in order to better display the ultrasonic vibration energy.

Yet another object of the present invention is to employ a tuned probe assembly as a pickup device.

Other objects and advantages of the present invention will become apparent upon reference to the following description and accompanying drawing in which:

The sole figure is a block diagram of the cavitation detector employed in the present invention.

Broadly stated, the present invention provides the means and method for detecting and analyzing the noise attendant on fluid flow through small orifices, particularly in components such as servo-valves found in hydraulic systems. The detector disclosed herein employs a tuned probe which is held against the servo-valve or other hydraulic component being analyzed. The probe crystal and the detector's circuit are such that ambient noise below about 30,000 c.p.s. is ignored, but the reception includes frequencies from 30,000 c.p.s. to over 100,000 c.p.s. The lower limit of 30,000 c.p.s. was chosen to insure that all sonic effects would be rejected. To better display the cavitation signal, the amplifiers are logarithmic in response. The output of the detector is an "averaging" type rather than the "push-pull" type found in prior art devices.

Referring to the drawing, probe 10 is the member which makes physical contact with the system component being investigated. Probe 10 cooperates with a motion-to-voltage transducer such as piezoelectric crystal 11 to receive the ultrasonic cavitation signal. Crystal 11 generates an electrical output in response to the ultrasonic vibration. Probe 10 and crystal 11 are made with lengths in the ratio of the velocities of sound in the steel probe and the ceramic crystal, respectively. The support member located physically at the junction of probe 10 and crystal 11, therefore, is at a node of vibration and has minimum influence on the response of the probe. The acutal lengths of probe 10 and crystal 11 are chosen so as to produce mechanical resonance at 50,000 c.p.s. and multiples of this frequency, thus giving a maximum electrical output from piezoelectric crystal 11 at these frequencies. Hence, the probe assembly is said to be "tuned." In a preferred embodiment, probe 10 is made of ⅛ inch diameter stainless steel rod one inch in length. Crystal 11 is ⅜ inch in diameter and ½ inch long. A piezoelectric crystal is preferred to other forms of motion-to-voltage transducers because the latter are deficient in sensitivity at high frequency. The crystal provides high sensitivity in a compact structure.

With continued reference to the drawing, crystal 11 has its output coupled to impedance converter 12. The impedance converter is mounted physically adjacent to crystal 11. Its function is to transform the relatively high impedance of the crystal to a low impedance at the connection of a flexible cable joining impedance converter 12 with high-pass filter 13, thus minimizing signal loss in the cable. Filter 13 is one of three high-pass filters in the system designed to exclude electrical frequencies which arise from sounds in the audible region as, for example, from hydraulic pumps and other machinery, without significantly reducing the ultrasonic signals from cavitation. In series with filter 13 is amplifier 14 which is made logarithmic by the addition, in parallel, of two or more diodes of determined character which comprises the substance of a logarithmic feed-back circuit. Construction of such a circuit is within the knowledge of one skilled in the art.

Again referring to the drawing, the output of logarithmic amplifier 14 is directed through high-pass filter 15 to a second logarithmic amplifier 16. Following this is another high-pass filter, identified by reference character 17, the output of which is directed to a third logarithmic amplifier 18. The output of amplifier 18 divides in two directions. One branch includes temperature compensator 19 and A.C. voltmeter 20. The function of temperature compensator 19 is to correct for the variations of gain in the amplifier system with changes in ambient temperature. The gain variations are caused by the temperature sensitivity of the diodes used to produce the logarithmic response. A.C. voltmeter 20 serves as the readout meter for the instrument.

The other circuit branch from the output of amplifier 18 includes low-pass filter 21, test crystal 22 and test plate 23. This branch comprises a test means for the entire circuit, allowing feed-back through probe 10 for indication of system operability. The feedback circuit test means is energized by transient noise which is created in the act of contacting test plate 23 with probe 10. Alternatively, the transient noises necessary to energize the feedback test circuit may come from a wide variety of sources, e.g., diodes, transistors, local vibrations and the like. The system now energized, a low frequency signal from low-pass filter 21 cooperates with crystal 22 to produce a vibration of test plate 23. By placing probe 10 in contact with test plate 23, an oscillating circuit is established which includes all of the elements represented by reference characters 10 through 18. The reading produced by meter 20 as the result of this oscillation serves as a check on correct functioning of the circuit.

Low-pass filter 21 is an inductor which, with test crystal 22, forms a circuit resonant at 30,000 c.p.s. The purpose of filter 21 is to restrict oscillation of the system, when probe 10 is placed on test plate 23 for a functional check of the instrument circuit, to the lowest of several possible frequencies. Without the filter, oscillation may occur at various frequencies with corresponding changes of meter reading. The use of logarithmic amplifiers in the circuit of the present invention accommodates vibration amplitudes over a range of 10,000 to 1.

In using the means of the present invention illustrated by the drawing, the tip of probe 10 is held against the servo-valve or other hydraulic component being investigated. It is desirable to hold the tip section of the probe approximately normal to the surface being explored. A smooth surface should be chosen if one is available. It has been found that the application of approximately 500 grams of thrust to the probe is desirable for good contact and good detection. The piezoelectric device within the probe converts the cavitation energy into an electrical signal. To provide adequate sensitivity to cavitation noises, the output of the piezoelectric device is amplified by the logarithmic amplifiers. Throughout the several stages of amplification, the signal is subjected to a plurality of high-pass filters having a severe rejection to all frequencies in the audible range. Thereafter, the amplified ultrasonic signal is directed to a temperature compensator and then to a readout meter.

The meter reading which is ultimately obtained is a function of the degree of cavitation of the fluid being studied. To a limited extent, it is also a function of the fluid flow, i.e., the internal leakage if the component under study is a servo-valve.

Attempts have been made to relate signal level of the detector of the present invention to rate of fluid flow or leakage through a small orifice. The flow calibration curves, however, usually depart from conventional, resulting in an S-shaped curve. This has led to the conclusion that the detector is sensing the onset and progress of cavitation as the orifice flow is increased. The cavitation signal eventually saturates and the detector output remains essentially constant. The true relationship with flow thus becomes obscured.

Thus, the precise relationship between scale reading and fluid flow or leakage depends upon various factors determined by the hydraulic system itself, but primarily it depends upon the degree of cavitation which the fluid is experiencing.

Utility of the means and method of the present invention has been demonstrated by actual tests on production aircraft. The sensitivity and range of the detector makes it possible to distinguish excessive internal leakage from normal internal leakage in a servo-valve. Thus, it is a simple matter to locate a valve which has been functionally impaired by cavitation damage. The measurement of ultrasonic noise caused by cavitation due to flow in aircraft hydraulic systems is a valuable technique for trouble-shooting such systems.

While this invention has been described with respect to specific examples and embodiments, it is to be understood that the invention is not limited thereto and that it can be variously practiced within the scope of the following claims.

The embodiments of this invention in which an exclusive property or privilege is claimed are defined as follows:

1. Apparatus for detecting cavitation in fluid flowing within a chamber comprising, in combination, probe means adapted to convert motion into an electrical signal, said probe means being resonant at determined frequencies within the range of cavitation impulse frequency, logarithmic amplifier means adapted to strengthen the electrical signal, high-pass filter means adapted to reject noises in the audible region feed-back circuit test means energized by transient noise and adapted to functionally test said apparatus when said probe means contacts said circuit test means, and readout means for displaying cavitation intensity.

2. Apparatus of claim 1 wherein the probe means comprises a tip section cooperating with a piezoelectric crystal, the length of said tip section and the length of said crystal being in the ratio of the velocity of sound in said tip section and in said crystal, respectively.

3. Apparatus of claim 1 wherein the feed-back circuit test means comprises a low-pass filter cooperating with a test crystal to vibrate a test plate from transient noise sources, and wherein the probe means in contact with said test plate forms an oscillating test circuit resonant at a determined frequency.

References Cited

UNITED STATES PATENTS

| | | | |
|---|---|---|---|
| 3,192,516 | 6/1965 | Simpkins et al. | 340—242 |
| 2,614,645 | 10/1952 | Wilhelm | 73—69X |
| 3,173,086 | 3/1965 | Kresge | 324—52 |
| 3,254,528 | 6/1966 | Michael | 73—40.5X |
| 3,381,525 | 5/1968 | Kartluke et al. | 73—67 |

RICHARD C. QUEISSER, Primary Examiner

A. E. KORKOSZ, Assistant Examiner